US012033596B2

(12) United States Patent
Zhang

(10) Patent No.: US 12,033,596 B2
(45) Date of Patent: Jul. 9, 2024

(54) DISPLAY DEVICE AND DISPLAY METHOD THEREOF

(71) Applicants: Huizhou China Star Optoelectronics Display Co., Ltd., Guangdong (CN); TCL China Star Optoelectronics Technology Co., Ltd., Guangdong (CN)

(72) Inventor: Yonglei Zhang, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/430,391

(22) PCT Filed: Jun. 25, 2021

(86) PCT No.: PCT/CN2021/102316
§ 371 (c)(1),
(2) Date: Aug. 12, 2021

(87) PCT Pub. No.: WO2022/257193
PCT Pub. Date: Dec. 15, 2022

(65) Prior Publication Data

US 2024/0013741 A1 Jan. 11, 2024

(30) Foreign Application Priority Data

Jun. 8, 2021 (CN) ......................... 202110635690.8

(51) Int. Cl.
*G09G 3/36* (2006.01)

(52) U.S. Cl.
CPC ... *G09G 3/3607* (2013.01); *G09G 2320/0271* (2013.01)

(58) Field of Classification Search
CPC ......... G09G 3/3607; G09G 2320/0271; G09G 3/3614
See application file for complete search history.

(56) References Cited

U.S. PATENT DOCUMENTS

| | | | | |
|---|---|---|---|---|
| 10,891,890 | B1 | 1/2021 | Choi | |
| 2005/0122295 | A1* | 6/2005 | Sawabe | G09G 3/3614 345/88 |
| 2008/0018589 | A1 | 1/2008 | Shih | |
| 2017/0287418 | A1* | 10/2017 | Hwang | G09G 3/3614 |

FOREIGN PATENT DOCUMENTS

| | | |
|---|---|---|
| CN | 105551425 | 5/2016 |
| CN | 107657931 | 2/2018 |
| CN | 110970000 | 4/2020 |
| CN | 112509514 | 3/2021 |

OTHER PUBLICATIONS

International Search Report and the Written Opinion dated Feb. 24, 2022 From the International Searching Authority Re. Application No. PCT/CN2021/102316 and Its Translation Into English. (16 Pages).

* cited by examiner

*Primary Examiner* — Kevin M Nguyen

(57) ABSTRACT

The present disclosure provides a display device and a display method thereof. When a change of a grayscale data of a sub-pixel between a current frame and a previous frame, and a change of a polarity of a data voltage of the sub-pixel between the current frame and the previous frame satisfy a compensation condition, the grayscale data of the sub-pixel in the current frame is compensated.

11 Claims, 4 Drawing Sheets

(A) (B)

DISPLAY DEVICE AND DISPLAY METHOD THEREOF

RELATED APPLICATIONS

This application is a National Phase of PCT Patent Application No. PCT/CN2021/102316 having International filing date of Jun. 25, 2021, which claims the benefit of priority of Chinese Patent Application No. 202110635690.8 filed on Jun. 8, 2021. The contents of the above applications are all incorporated by reference as if fully set forth herein in their entirety.

FIELD AND BACKGROUND OF THE INVENTION

The present disclosure relates to the field of display technology, and more particularly, to a display device and a display method thereof.

At present, for a liquid crystal display device where a data line is connected to a column of sub-pixels and a row of sub-pixels is connected to a scan line, when a grayscale data applied to each sub-pixel has a high and low gray level switching between two adjacent frames, and polarities of data voltages applied to two adjacent columns of sub-pixels are opposite, and the polarity of the data voltage applied to the each sub-pixel is inverted once per frame, that is, when a time-domain viewing angle control (viewing angle control, VAC) algorithm is configured to drive, a display of the liquid crystal display device shows a head-shaking pattern.

Therefore, a technical solution needs to be proposed to solve a head-shaking pattern problem that exists when driving by the time-domain viewing angle control algorithm.

SUMMARY OF THE INVENTION

The present disclosure provides a display device and a display method thereof, which can solve a head-shaking pattern problem when driving by a time-domain viewing angle control algorithm.

A display method of a display device. The display device includes a display panel, and the display panel includes a plurality of sub-pixels, and the display method includes following steps:

obtaining a change of a grayscale data of the sub-pixel between a current frame and a previous frame and a change of a polarity of a data voltage of the sub-pixel between the current frame and the previous frame, wherein the grayscale data of the sub-pixel in the current frame is determined by an original grayscale data of the sub-pixel in the current frame and a preset high and low grayscale compensation set, and the grayscale data of the sub-pixel in the previous frame is determined by an original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame;

when the change of the grayscale data of the sub-pixel between the current frame and the previous frame and the change of the polarity of the data voltage of the sub-pixel between the current frame and the previous frame satisfy a preset compensation condition, determining a grayscale compensation data by a difference value of the grayscale data of the sub-pixel between the current frame and the previous frame, the change of the polarity of the data voltage of the sub-pixel between the current frame and the previous frame, and a corresponding preset compensation data set, wherein the preset compensation data set includes a preset difference value, and a preset grayscale compensation data corresponding to the preset difference value;

determining a corrected grayscale data of the sub-pixel in the current frame according to the grayscale data of the sub-pixel in the current frame and the grayscale compensation data; and displaying the sub-pixel in the current frame according to the data voltage corresponding to the corrected grayscale data.

A display device, wherein the display device includes:

an obtaining module, configured to obtain a change of a grayscale data of a sub-pixel between a current frame and a previous frame and a change of a polarity of a data voltage of the sub-pixel between the current frame and the previous frame, wherein the grayscale data of the sub-pixel in the current frame is determined by an original grayscale data of the sub-pixel in the current frame and a preset high and low grayscale compensation set, and the grayscale data of the sub-pixel in the previous frame is determined by an original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame;

a grayscale compensation data determining module, configured to determine a grayscale compensation data by a difference value of the grayscale data of the sub-pixel between the current frame and the previous frame, the change of the polarity of the data voltage of the sub-pixel between the current frame and the previous frame, and a corresponding preset compensation data set, when the change of the grayscale data of the sub-pixel between the current frame and the previous frame and the change of the polarity of the data voltage of the sub-pixel between the current frame and the previous frame satisfy a preset compensation condition, wherein the preset compensation data set includes a preset difference, and a preset grayscale compensation data corresponding to the preset difference;

a corrected grayscale data determining module, configured to determine a corrected grayscale data of the sub-pixel in the current frame according to the grayscale data of the sub-pixel in the current frame and the grayscale compensation data; and a display panel, including a plurality of sub-pixels, and the sub-pixel is configured to display in the current frame according to the data voltage corresponding to the corrected grayscale data.

The present disclosure provides the display device and the display method thereof. When the change of the grayscale data of the sub-pixel between the current frame and the previous frame and the change of the polarity of the data voltage of the sub-pixel between the current frame and the previous frame satisfy the preset compensation condition, wherein the grayscale data of the sub-pixel in the current frame is determined by the original grayscale data of the sub-pixel in the current frame and the preset high and low grayscale compensation set, and the grayscale data of the sub-pixel in the previous frame is determined by the original grayscale data of the sub-pixel in the previous frame and the preset high and low grayscale compensation set, and one of the grayscale data in the current frame and the grayscale data in the previous frame of the sub-pixel is greater than or equal to the corresponding original grayscale data, and the other of the grayscale data in the current frame and the grayscale data in the previous frame of the sub-pixel is less than or equal to the corresponding original grayscale data, a grayscale compensation data is determined by the difference value of the grayscale data of the sub-pixel between the current frame and the previous frame, the change of the polarity of the data voltage of the sub-pixel between the current frame and the previous frame, and the corresponding preset compensation data set, wherein the preset compensation data set includes the preset difference value, and the preset grayscale compensation data corresponding to the preset difference value. A corrected grayscale data of the sub-pixel in the current frame is determined according to the grayscale data of the sub-pixel in the current frame and the grayscale compensation data. The sub-pixel in the current frame is displayed according the data voltage corresponding to the corrected grayscale data to relieve the head-shaking pattern caused by a switching between a high grayscale and a low grayscale when driving by the time-domain viewing angle control algorithm, and a brightness inconsistency of the positive and negative grayscale of the same grayscale, and to improve the display quality of the display device.

DETAILED DESCRIPTION OF SPECIFIC EMBODIMENTS OF THE INVENTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work fall within the protection scope of the present disclosure.

Figure 1:
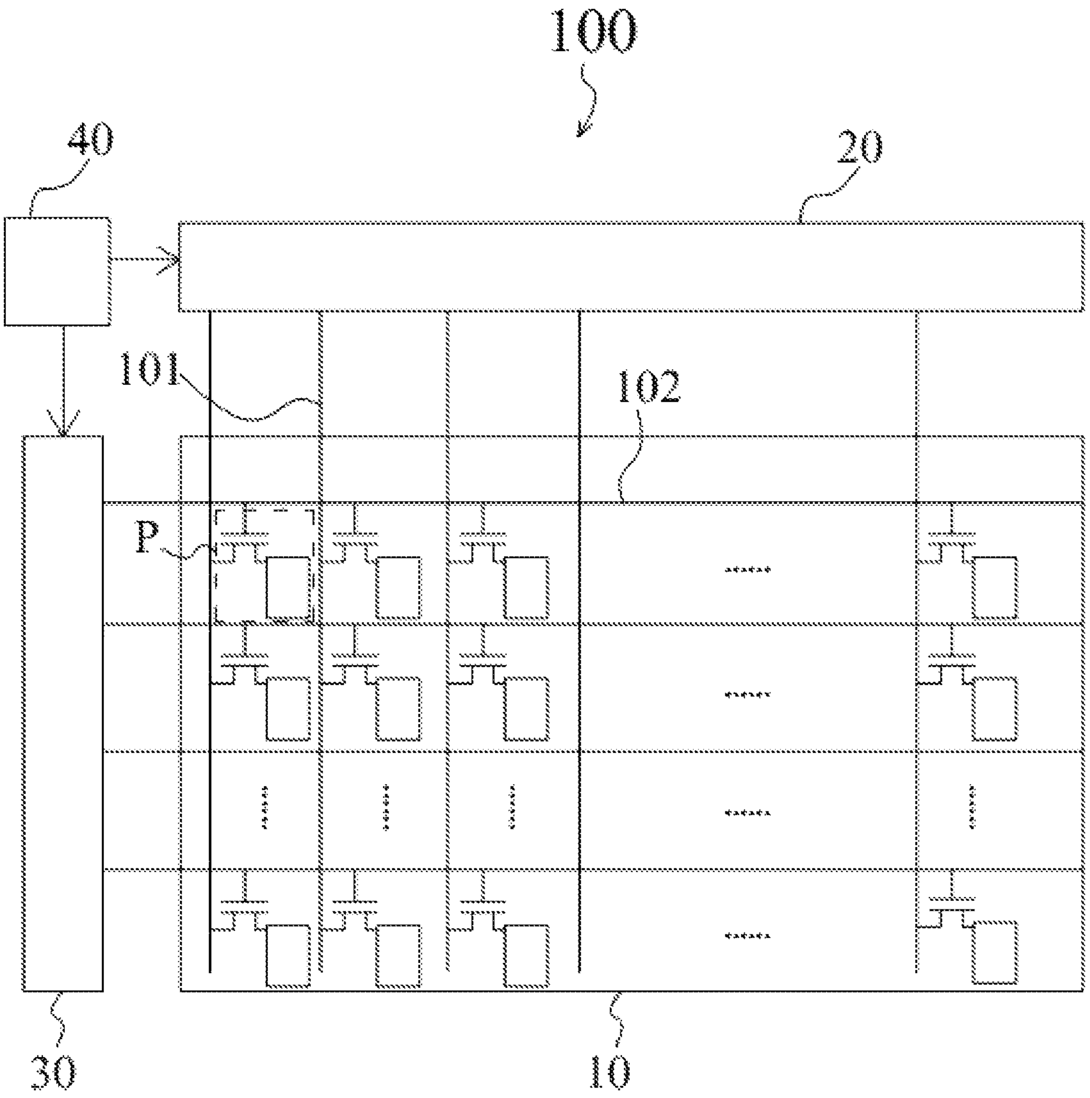
FIG. 1 is a schematic diagram of a display device according to an embodiment of the present disclosure.

As shown in FIG. 1, an embodiment of the present disclosure provides a schematic diagram of a display device. A display device 100 is a vertical alignment (VA) type liquid crystal display device. The display device 100 includes a display panel 10, a source driver 20, a gate driver 30, and a timing controller 40. The timing controller 40 is electrically connected to the source driver 20 and the gate driver 30. The source driver 20 and the gate driver 30 are both electrically connected to the display panel 10.

In the embodiment, the display panel 10 includes a plurality of sub-pixels P disposed in an array, a plurality of data lines 101, and a plurality of scan lines 102. Each column of the sub-pixels P are connected to one data line 101, and each row of the sub-pixels are connected to one scan line 102. That is, the display panel 10 adopts a 1G1D framework.

Figure 2:
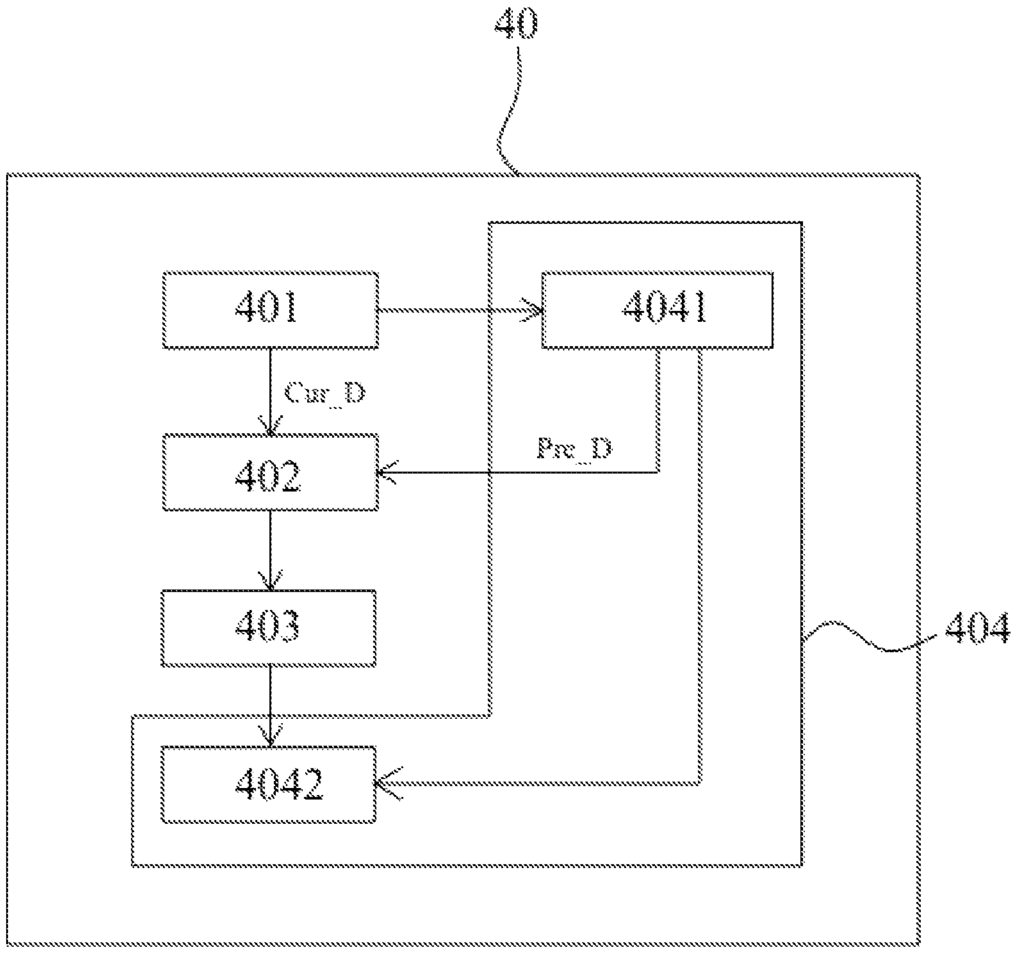
FIG. 2 is a framework schematic diagram of a timing controller shown in FIG. 1.

In the present disclosure, as shown in FIG. 2, the timing controller 40 includes a high and low grayscale compensation module 401, an obtaining module 402, a grayscale compensation data determining module 402, and a corrected grayscale data determining module 404. The corrected grayscale data determining module 404 includes an overdrive unit 4041 and a corrected grayscale data calculation unit 4042.

Before displaying each frame of pictures, the timing controller 40 receives an image data corresponding to the each frame of the pictures, and the image data includes an initial grayscale data of each sub-pixel corresponding to the display panel. The high and low grayscale compensation module 401 outputs a high grayscale data (greater than or equal to the initial grayscale data) or a low grayscale data (less than or equal to the initial grayscale data) after a high and low (HL) grayscale operation according to the initial grayscale data and a preset high and low grayscale data set to improve a wide angle of a VA type liquid crystal display device, after receiving the initial grayscale data.

Wherein, a data voltage corresponding to a high grayscale data after a high grayscale operation is a high grayscale data voltage. A data voltage corresponding to a low grayscale data after a low grayscale operation is a low grayscale data voltage. The preset high and low grayscale data set includes a preset initial grayscale data, a preset high grayscale data corresponding to the preset initial grayscale data, and a preset low grayscale data corresponding to the preset initial grayscale data. The high grayscale data is greater than or equal to the preset initial grayscale data, and the preset low grayscale data is less than or equal to the preset initial grayscale data.

For example, the preset initial grayscale data is 230. The preset high grayscale data corresponding to the preset initial grayscale data is 235, and the preset low grayscale data corresponding to the preset initial grayscale data is 225. If the initial grayscale data of the sub-pixel is 230, the initial grayscale data of the sub-pixel is 235 after the high grayscale operation, and the high and low grayscale compensation module 401 outputs 235. The preset high and low grayscale data set according to the present disclosure can be obtained through experimental tests, and the high and low grayscale operation is implemented by existing technology, and no further details are given here.

In the present embodiment, for the each frame of the pictures, the initial grayscale data of the sub-pixel processed by the high and low grayscale compensation module 401 is transmitted in the overdrive unit 4041, and the overdrive unit 4041 outputs an overdrive grayscale data by performing an overdrive compensation on the high grayscale data or the low grayscale data according to an overdrive compensation data set. Wherein, the overdrive compensation data set includes a preset grayscale data of the sub-pixel in a previous frame, the preset grayscale data of the sub-pixel in a current frame, and a preset overdrive compensation data.

For example, the high grayscale data of the sub-pixel in the current frame after the high grayscale operation output by the high and low grayscale compensation module 401 is 224. The low grayscale data of the sub-pixel in the previous frame after the low grayscale operation output by the high and low grayscale compensation module 401 is 32. In the overdrive compensation data set, when the preset grayscale data in the current frame is 224 and the preset grayscale data in the previous frame is 32, a corresponding preset overdrive compensation data is 230. The overdrive compensation data set can be obtained by the experimental tests, and no further details are given here.

In the present disclosure, the obtaining module 402 is configured to obtain a change of a grayscale data of the sub-pixel between the current frame and the previous frame and a change of a polarity of the data voltage of the sub-pixel between the current frame and the previous frame. The grayscale data of the sub-pixel in the current frame is determined by the original grayscale data of the sub-pixel in the current frame and the preset high and low grayscale compensation set. The grayscale data of the sub-pixel in the previous frame is determined by the original grayscale data of the sub-pixel in the previous frame and the preset high and low grayscale compensation set. One of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data. The polarity of the data voltage of the sub-pixel is opposite in the current frame compared to the previous frame.

Specifically, the obtaining module 402 obtains a first grayscale data Cur_D of the sub-pixel in the current frame from the high and low grayscale compensation module 401, and a second grayscale data Pre_D of the sub-pixel in the previous frame from the overdrive unit 4041. The first grayscale data Cur_D is a grayscale data of the initial grayscale data of the sub-pixel in the current frame after the high grayscale operation. The second grayscale data Pre_D is a grayscale data of the initial grayscale data of the sub-pixel in the previous frame after the low grayscale operation. A high and low grayscale change occurs between the first grayscale data Cur_D and the second grayscale data Pre_D. Wherein, the overdrive unit 4041 needs to perform an overdrive compensation on the second grayscale data Pre_D in the previous frame, so the overdrive unit 4041 stores the second grayscale data Pre_D.

The obtaining module 402 is further configured to obtain the polarity of the data voltage of the sub-pixel in the current frame and the polarity of the data voltage in the previous frame. The polarity of the data voltage of the sub-pixel is opposite in the current frame compared to the previous frame, and the polarity of the data voltage of the sub-pixel in the current frame and in the previous frame is fixed. From the previous frame to the current frame, the grayscale data of each sub-pixel is switched between the high grayscale and the low grayscale, and the polarity of the grayscale data of each sub-pixel is reversed once.

The change of the data voltage of the sub-pixel includes four cases. A first case is that the data voltage of the sub-pixel jumps from a positive polarity low grayscale (+L) to a negative polarity high grayscale (−H). A second case is that the data voltage of the sub-pixel jumps from a negative polarity low grayscale (−L) to a positive polarity high grayscale (+H). A third case is that the data voltage of the sub-pixel jumps from the negative polarity high grayscale (−H) to the positive polarity low grayscale (+L). A fourth case is that the data voltage of the sub-pixel jumps from the positive polarity high grayscale (+H) to the negative polarity low grayscale (−L).

In the present disclosure, the grayscale compensation data determining module 403 is configured to determine the grayscale compensation data by a difference value of the grayscale data of the sub-pixel between the current frame and the previous frame, the change of the polarity of the data voltage of the sub-pixel between the current frame and the previous frame, and a corresponding preset compensation data set, when the change of the grayscale data of the sub-pixel between the current frame and the previous frame and the change of the polarity of the data voltage of the sub-pixel between the current frame and the previous frame satisfy a preset compensation condition. The preset compensation data set includes a preset difference value, and a preset grayscale compensation data corresponding to the preset difference value.

In the present disclosure, the preset compensation condition includes: the grayscale data in the current frame is greater than or equal to the corresponding original grayscale data, and the grayscale data in the previous frame of the sub-pixel is less than or equal to the corresponding original grayscale data, and a difference value between the grayscale data of the sub-pixel in the current frame minus the grayscale data of the sub-pixel in the previous is greater than or equal to a first preset difference threshold value, and less than or equal to a second preset difference threshold value. The second preset difference threshold value is greater than the first preset difference threshold value, and the first preset difference threshold value is greater than or equal to 0. The data voltage of the sub-pixel jumps from the negative polarity low grayscale (−L) in the previous frame to the positive polarity high grayscale (+H) in the current frame, or the data voltage of the sub-pixel jumps from the positive polarity low grayscale (+L) in the previous frame to the negative polarity high grayscale (−H) in the current frame. And only when the difference value between the high grayscale data of the sub-pixel in the current frame minus the low grayscale data of the sub-pixel in the previous frame is within a certain range, the preset compensation condition can be satisfied.

It should be noted that, based on a large number of experiments, when the data voltage of the sub-pixel jumps from the negative polarity low grayscale (−L) in the previous frame to the positive polarity high grayscale (+H) in the current frame, or the data voltage of the sub-pixel jumps from the positive polarity low grayscale (+L) in the previous frame to the negative polarity high grayscale (−H) in the current frame, the difference value between the high grayscale data of the sub-pixel in the current frame minus the low grayscale data of the sub-pixel in the previous frame is within the certain range, and the head-shaking patterns (vertical lines on the screen occurring when looking at a display panel) occurs when the liquid crystal display device displays. Therefore, the grayscale compensation is needed to relieve a head-shaking pattern problem when the data voltage of the sub-pixel jumps from the negative polarity low grayscale (−L) to the positive polarity high grayscale (+H), or jumps from the positive polarity low grayscale (+L) to the negative polarity high grayscale (−H).

In the present disclosure, the first preset difference threshold value is less than or equal to 19, and greater than or equal to 0. The second preset difference threshold value is greater than or equal to 160, and less than or equal to 255. The first preset difference threshold value can be 1, 3, 5, 7, 8, 10, 12, 14, 16, and 18. The second preset difference threshold value can be 165, 168, 170, 172, 180, 185, 190, 194, 196, and 220.

As shown in table 1, table 1 is the first preset compensation data set when the data voltage of the sub-pixel jumps from the negative polarity low grayscale (−L) in the previous frame to the positive polarity high grayscale (+H) in the current frame. Wherein, x is a preset difference value of the high grayscale data in the current frame minus the low grayscale data in the previous frame, and f1 is the preset grayscale compensation data corresponding to the preset difference value.

As shown in table 2, table 2 is the second preset compensation data set when the data voltage of the sub-pixel jumps from the positive polarity low grayscale (+L) in the previous frame to the negative polarity high grayscale (−H) in the current frame. Wherein, x is the preset difference value of the high grayscale data in the current frame minus the low grayscale data in the previous frame, and f2 is the preset grayscale compensation data corresponding to the preset difference value.

As shown in table 1, when the data voltage of the sub-pixel jumps from the negative polarity low grayscale (−L) in the previous frame to the positive polarity high grayscale (+H) in the current frame, and the preset difference value is less than or equal to 17, and the preset difference value is greater than or equal to 167, and less than or equal to 255, the preset grayscale compensation data is 0. The preset difference value is greater than or equal to 167, and less than or equal to 255, the preset grayscale compensation data are all positive values. And the preset grayscale compensation data first increases, then remains unchanged, and finally becomes smaller, as the preset difference value gradually increases.

As shown in table 2, when the data voltage of the sub-pixel jumps from the positive polarity low grayscale (+L) in the previous frame to the negative polarity high grayscale (−H) in the current frame, and the preset difference value is less than or equal to 19, and the preset difference value is greater than or equal to 161, and less than or equal to 255, the preset grayscale compensation data is 0. When the preset difference value is greater than or equal to 20, and less than or equal to 160, the preset grayscale compensation data are all negative values. And the preset grayscale compensation data first decreases, then remains unchanged, and finally increases, as the preset difference value gradually increases.

In addition, the first preset compensation data set is different from the second preset compensation data set. The preset difference value is greater than or equal to 20, and less than or equal to 160. The preset grayscale compensation data corresponding to the preset difference value when the data voltage of the sub-pixel jumps from the negative polarity low grayscale (−L) in the previous frame to the positive polarity high grayscale (+H) in the current frame is different from the preset grayscale compensation data corresponding to the preset difference value when the data voltage of the sub-pixel jumps from the positive polarity low grayscale (+L) in the previous frame to the negative polarity high grayscale (−H). A main reason is that a corresponding brightness is different, when the sub-pixels are in a same grayscale but the polarity of the data voltage is different. For example, a brightness when the data voltage corresponding to the high grayscale data is positive is different from a brightness when the data voltage corresponding to the high grayscale data is negative, resulting in different preset grayscale compensation data. The present disclosure can relieve the head-shaking pattern problem by compensating the grayscale data of the sub-pixel satisfying the preset compensation condition.

Table 1 shows the first preset compensation data set when the data voltage of the sub-pixel jumps from the negative polarity low grayscale in the previous frame to the positive polarity high grayscale in the current frame

| x | f1 |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 1 |
| 19 | 2 |
| 20 | 3 |
| 21 | 4 |
| 22 | 5 |
| 23 | 6 |
| 24 | 7 |
| 25 | 8 |
| 26 | 9 |
| 27 | 10 |
| 28 | 11 |
| 29 | 12 |
| 30 | 13 |
| 31 | 14 |
| 32 | 15 |
| 33 | 16 |
| 34 | 17 |
| 35 | 18 |
| 36 | 19 |
| 37 | 20 |
| 38 | 21 |
| 39 | 22 |
| 40 | 23 |
| 41 | 24 |
| 42 | 25 |
| 43 | 26 |
| 44 | 27 |
| 45 | 28 |
| 46 | 29 |
| 47 | 30 |
| 48 | 31 |
| 49 | 32 |
| 50 | 33 |
| 51 | 34 |
| 52 | 35 |
| 53 | 35 |
| 54 | 35 |
| 55 | 35 |
| 56 | 35 |
| 57 | 35 |
| 58 | 35 |
| 59 | 35 |
| 60 | 35 |
| 61 | 35 |
| 62 | 35 |
| 63 | 35 |
| 64 | 35 |
| 65 | 35 |
| 66 | 35 |
| 67 | 35 |

-continued

| x | f1 |
|---|---|
| 68 | 35 |
| 69 | 35 |
| 70 | 35 |
| 71 | 35 |
| 72 | 35 |
| 73 | 35 |
| 74 | 35 |
| 75 | 35 |
| 76 | 35 |
| 77 | 35 |
| 78 | 35 |
| 79 | 35 |
| 80 | 35 |
| 81 | 35 |
| 82 | 35 |
| 83 | 35 |
| 84 | 35 |
| 85 | 35 |
| 86 | 35 |
| 87 | 35 |
| 88 | 35 |
| 89 | 35 |
| 90 | 35 |
| 91 | 35 |
| 92 | 35 |
| 93 | 35 |
| 94 | 35 |
| 95 | 35 |
| 96 | 35 |
| 97 | 35 |
| 98 | 35 |
| 99 | 35 |
| 100 | 35 |
| 101 | 35 |
| 102 | 35 |
| 103 | 35 |
| 104 | 35 |
| 105 | 35 |
| 106 | 35 |
| 107 | 35 |
| 108 | 35 |
| 109 | 35 |
| 110 | 35 |
| 111 | 35 |
| 112 | 35 |
| 113 | 35 |
| 114 | 35 |
| 115 | 35 |
| 116 | 35 |
| 117 | 35 |
| 118 | 35 |
| 119 | 35 |
| 120 | 35 |
| 121 | 35 |
| 122 | 35 |
| 123 | 35 |
| 124 | 35 |
| 125 | 35 |
| 126 | 35 |
| 127 | 35 |
| 128 | 35 |
| 129 | 35 |
| 130 | 35 |
| 131 | 35 |
| 132 | 35 |
| 133 | 34 |
| 134 | 33 |
| 135 | 32 |
| 136 | 31 |
| 137 | 30 |
| 138 | 29 |
| 139 | 28 |
| 140 | 27 |
| 141 | 26 |
| 142 | 25 |
| 143 | 24 |
| 144 | 23 |

-continued

| x | f1 |
|---|---|
| 145 | 22 |
| 146 | 21 |
| 147 | 20 |
| 148 | 19 |
| 149 | 18 |
| 150 | 17 |
| 151 | 16 |
| 152 | 15 |
| 153 | 14 |
| 154 | 13 |
| 155 | 12 |
| 156 | 11 |
| 157 | 10 |
| 158 | 9 |
| 159 | 8 |
| 160 | 7 |
| 161 | 6 |
| 162 | 5 |
| 163 | 4 |
| 164 | 3 |
| 165 | 2 |
| 166 | 1 |
| 167 | 0 |
| 168 | 0 |
| 169 | 0 |
| 170 | 0 |
| 171 | 0 |
| 172 | 0 |
| 173 | 0 |
| 174 | 0 |
| 175 | 0 |
| 176 | 0 |
| 177 | 0 |
| 178 | 0 |
| 179 | 0 |
| 180 | 0 |
| 181 | 0 |
| 182 | 0 |
| 183 | 0 |
| 184 | 0 |
| 185 | 0 |
| 186 | 0 |
| 187 | 0 |
| 188 | 0 |
| 189 | 0 |
| 190 | 0 |
| 191 | 0 |
| 192 | 0 |
| 193 | 0 |
| 194 | 0 |
| 195 | 0 |
| 196 | 0 |
| 197 | 0 |
| 198 | 0 |
| 199 | 0 |
| 200 | 0 |
| 201 | 0 |
| 202 | 0 |
| 203 | 0 |
| 204 | 0 |
| 205 | 0 |
| 206 | 0 |
| 207 | 0 |
| 208 | 0 |
| 209 | 0 |
| 210 | 0 |
| 211 | 0 |
| 212 | 0 |
| 213 | 0 |
| 214 | 0 |
| 215 | 0 |
| 216 | 0 |
| 217 | 0 |
| 218 | 0 |
| 219 | 0 |
| 220 | 0 |
| 221 | 0 |

-continued

| x | f1 |
|---|---|
| 222 | 0 |
| 223 | 0 |
| 224 | 0 |
| 225 | 0 |
| 226 | 0 |
| 227 | 0 |
| 228 | 0 |
| 229 | 0 |
| 230 | 0 |
| 231 | 0 |
| 232 | 0 |
| 233 | 0 |
| 234 | 0 |
| 235 | 0 |
| 236 | 0 |
| 237 | 0 |
| 238 | 0 |
| 239 | 0 |
| 240 | 0 |
| 241 | 0 |
| 242 | 0 |
| 243 | 0 |
| 244 | 0 |
| 245 | 0 |
| 246 | 0 |
| 247 | 0 |
| 248 | 0 |
| 249 | 0 |
| 250 | 0 |
| 251 | 0 |
| 252 | 0 |
| 253 | 0 |
| 254 | 0 |
| 255 | 0 |

Table 2 shows the second preset compensation data set when the data voltage of the sub-pixel jumps from the positive polarity low grayscale in the previous frame to the negative polarity high grayscale in the current frame

| x | f2 |
|---|---|
| 0 | 0 |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 0 |
| 19 | 0 |
| 20 | −1 |
| 21 | −1 |
| 22 | −1 |
| 23 | −2 |
| 24 | −2 |
| 25 | −2 |
| 26 | −2 |
| 27 | −3 |
| 28 | −3 |
| 29 | −4 |
| 30 | −5 |
| 31 | −6 |

-continued

| x | f2 |
|---|---|
| 32 | −7 |
| 33 | −8 |
| 34 | −9 |
| 35 | −10 |
| 36 | −11 |
| 37 | −12 |
| 38 | −13 |
| 39 | −14 |
| 40 | −15 |
| 41 | −16 |
| 42 | −17 |
| 43 | −18 |
| 44 | −19 |
| 45 | −20 |
| 46 | −21 |
| 47 | −22 |
| 48 | −23 |
| 49 | −24 |
| 50 | −25 |
| 51 | −25 |
| 52 | −25 |
| 53 | −25 |
| 54 | −25 |
| 55 | −25 |
| 56 | −25 |
| 57 | −25 |
| 58 | −25 |
| 59 | −25 |
| 60 | −25 |
| 61 | −25 |
| 62 | −25 |
| 63 | −25 |
| 64 | −25 |
| 65 | −25 |
| 66 | −25 |
| 67 | −25 |
| 68 | −25 |
| 69 | −25 |
| 70 | −25 |
| 71 | −25 |
| 72 | −25 |
| 73 | −25 |
| 74 | −25 |
| 75 | −25 |
| 76 | −25 |
| 77 | −25 |
| 78 | −25 |
| 79 | −25 |
| 80 | −25 |
| 81 | −25 |
| 82 | −25 |
| 83 | −25 |
| 84 | −25 |
| 85 | −25 |
| 86 | −25 |
| 87 | −25 |
| 88 | −25 |
| 89 | −25 |
| 90 | −25 |
| 91 | −25 |
| 92 | −25 |
| 93 | −25 |
| 94 | −25 |
| 95 | −25 |
| 96 | −25 |
| 97 | −25 |
| 98 | −25 |
| 99 | −25 |
| 100 | −25 |
| 101 | −25 |
| 102 | −25 |
| 103 | −25 |
| 104 | −25 |
| 105 | −25 |
| 106 | −25 |
| 107 | −25 |
| 108 | −25 |

-continued

| x | f2 |
| --- | --- |
| 109 | −25 |
| 110 | −25 |
| 111 | −25 |
| 112 | −25 |
| 113 | −25 |
| 114 | −25 |
| 115 | −25 |
| 116 | −25 |
| 117 | −25 |
| 118 | −25 |
| 119 | −25 |
| 120 | −25 |
| 121 | −25 |
| 122 | −25 |
| 123 | −25 |
| 124 | −25 |
| 125 | −25 |
| 126 | −25 |
| 127 | −25 |
| 128 | −25 |
| 129 | −25 |
| 130 | −25 |
| 131 | −25 |
| 132 | −25 |
| 133 | −25 |
| 134 | −24 |
| 135 | −24 |
| 136 | −24 |
| 137 | −23 |
| 138 | −23 |
| 139 | −22 |
| 140 | −21 |
| 141 | −20 |
| 142 | −19 |
| 143 | −18 |
| 144 | −17 |
| 145 | −16 |
| 146 | −15 |
| 147 | −14 |
| 148 | −13 |
| 149 | −12 |
| 150 | −11 |
| 151 | −10 |
| 152 | −9 |
| 153 | −8 |
| 154 | −7 |
| 155 | −6 |
| 156 | −5 |
| 157 | −4 |
| 158 | −3 |
| 159 | −2 |
| 160 | −1 |
| 161 | 0 |
| 162 | 0 |
| 163 | 0 |
| 164 | 0 |
| 165 | 0 |
| 166 | 0 |
| 167 | 0 |
| 168 | 0 |
| 169 | 0 |
| 170 | 0 |
| 171 | 0 |
| 172 | 0 |
| 173 | 0 |
| 174 | 0 |
| 175 | 0 |
| 176 | 0 |
| 177 | 0 |
| 178 | 0 |
| 179 | 0 |
| 180 | 0 |
| 181 | 0 |
| 182 | 0 |
| 183 | 0 |
| 184 | 0 |
| 185 | 0 |

-continued

| x | f2 |
| --- | --- |
| 186 | 0 |
| 187 | 0 |
| 188 | 0 |
| 189 | 0 |
| 190 | 0 |
| 191 | 0 |
| 192 | 0 |
| 193 | 0 |
| 194 | 0 |
| 195 | 0 |
| 196 | 0 |
| 197 | 0 |
| 198 | 0 |
| 199 | 0 |
| 200 | 0 |
| 201 | 0 |
| 202 | 0 |
| 203 | 0 |
| 204 | 0 |
| 205 | 0 |
| 206 | 0 |
| 207 | 0 |
| 208 | 0 |
| 209 | 0 |
| 210 | 0 |
| 211 | 0 |
| 212 | 0 |
| 213 | 0 |
| 214 | 0 |
| 215 | 0 |
| 216 | 0 |
| 217 | 0 |
| 218 | 0 |
| 219 | 0 |
| 220 | 0 |
| 221 | 0 |
| 222 | 0 |
| 223 | 0 |
| 224 | 0 |
| 225 | 0 |
| 226 | 0 |
| 227 | 0 |
| 228 | 0 |
| 229 | 0 |
| 230 | 0 |
| 231 | 0 |
| 232 | 0 |
| 233 | 0 |
| 234 | 0 |
| 235 | 0 |
| 236 | 0 |
| 237 | 0 |
| 238 | 0 |
| 239 | 0 |
| 240 | 0 |
| 241 | 0 |
| 242 | 0 |
| 243 | 0 |
| 244 | 0 |
| 245 | 0 |
| 246 | 0 |
| 247 | 0 |
| 248 | 0 |
| 249 | 0 |
| 250 | 0 |
| 251 | 0 |
| 252 | 0 |
| 253 | 0 |
| 254 | 0 |
| 255 | 0 |

In the present disclosure, the overdrive unit 4041 is configured to determine an overdrive grayscale data of the sub-pixel in the current frame by the grayscale data of the sub-pixel in the current frame and an overdrive data set. The corrected grayscale data calculation unit 4042 is configured to add the overdrive grayscale data to the grayscale compensation data to obtain the corrected grayscale data of the sub-pixel in the current frame. The overdrive data set is obtained through experiments in the prior art, and the overdrive compensation is as described above and will not be described in detail here.

In the present disclosure, when the change of the grayscale data of the sub-pixel between the current frame and the previous frame and the change of the polarity of the data voltage of the sub-pixel between the current frame and the previous frame satisfy the preset compensation condition, display is carried out according to the data voltage corresponding to the corrected grayscale data in the current frame, that is, the grayscale data is compensated to display.

In the present disclosure, when the change of the grayscale data of the sub-pixel between the current frame and the previous frame and the change of the polarity of the data voltage of the sub-pixel between the current frame and the previous frame do not satisfy the preset compensation condition, displaying of the sub-pixel is carried out in the current frame according to the grayscale data in the current frame. That is, the grayscale data of the sub-pixel in the current frame is not compensated.

Specifically, when the data voltage of the sub-pixel jumps from the positive polarity low grayscale (+L) in the previous frame to the negative polarity high grayscale (−H) in current frame, or from the negative polarity high grayscale (−H) to the positive polarity low grayscale (+L), the change of the grayscale data of the sub-pixel between the current frame and the previous frame and the change of the polarity of the data voltage of the sub-pixel between the current frame and the previous frame do not satisfy the preset compensation condition, displaying the sub-pixel in the current frame according to the grayscale data in the current frame.

Figure 3:
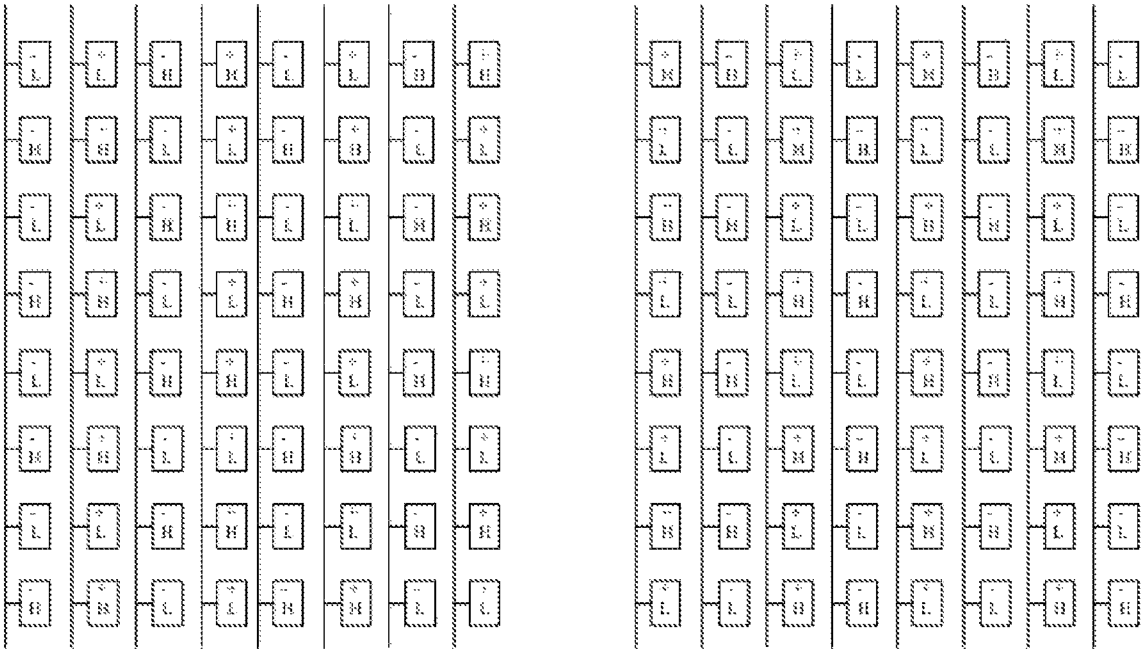
FIG. 3 is a schematic diagram of driving a display panel shown in FIG. 1 to display a current frame and a previous frame.

As shown in FIG. 3, FIG. 3 is a schematic diagram of driving the display panel as shown in FIG. 1 to display the current frame and the previous frame. Wherein (A) in FIG. 3 is a schematic diagram of driving the display panel to display the previous frame, and (B) in FIG. 3 is a schematic diagram of driving the display panel to display the current frame. As shown in (A) in FIG. 3 and (B) in FIG. 3, the polarities of the data voltage of the sub-pixels in a same column are the same, and the polarities of the data voltages of the sub-pixels in two adjacent columns are opposite. Four adjacent sub-pixels in a row direction form a group, and data voltages of two adjacent sub-pixels in the group of sub-pixels are all low grayscale voltages, and the data voltages of the other two adjacent sub-pixels are all high gray scale voltages. One of data voltages of two adjacent sub-pixels in the column direction is a high grayscale voltage and the other is a low grayscale voltage. From the previous frame to the current frame, the polarity of the data voltage of each sub-pixel is opposite, and the data voltage of each sub-pixel is switched between high and low gray levels. The driving method of the sub-pixels of the display panel of the present disclosure can also avoid a horizontal crosstalk.

The display device of the present disclosure compensates the grayscale data of the sub-pixel satisfying the preset compensation condition to relieve the head-shaking pattern caused by a switching between a high grayscale and a low grayscale when driving by the time-domain viewing angle control algorithm, and a brightness inconsistency of the positive and negative grayscale of the same grayscale, and to improve the display quality of the display device.

Figure 4:
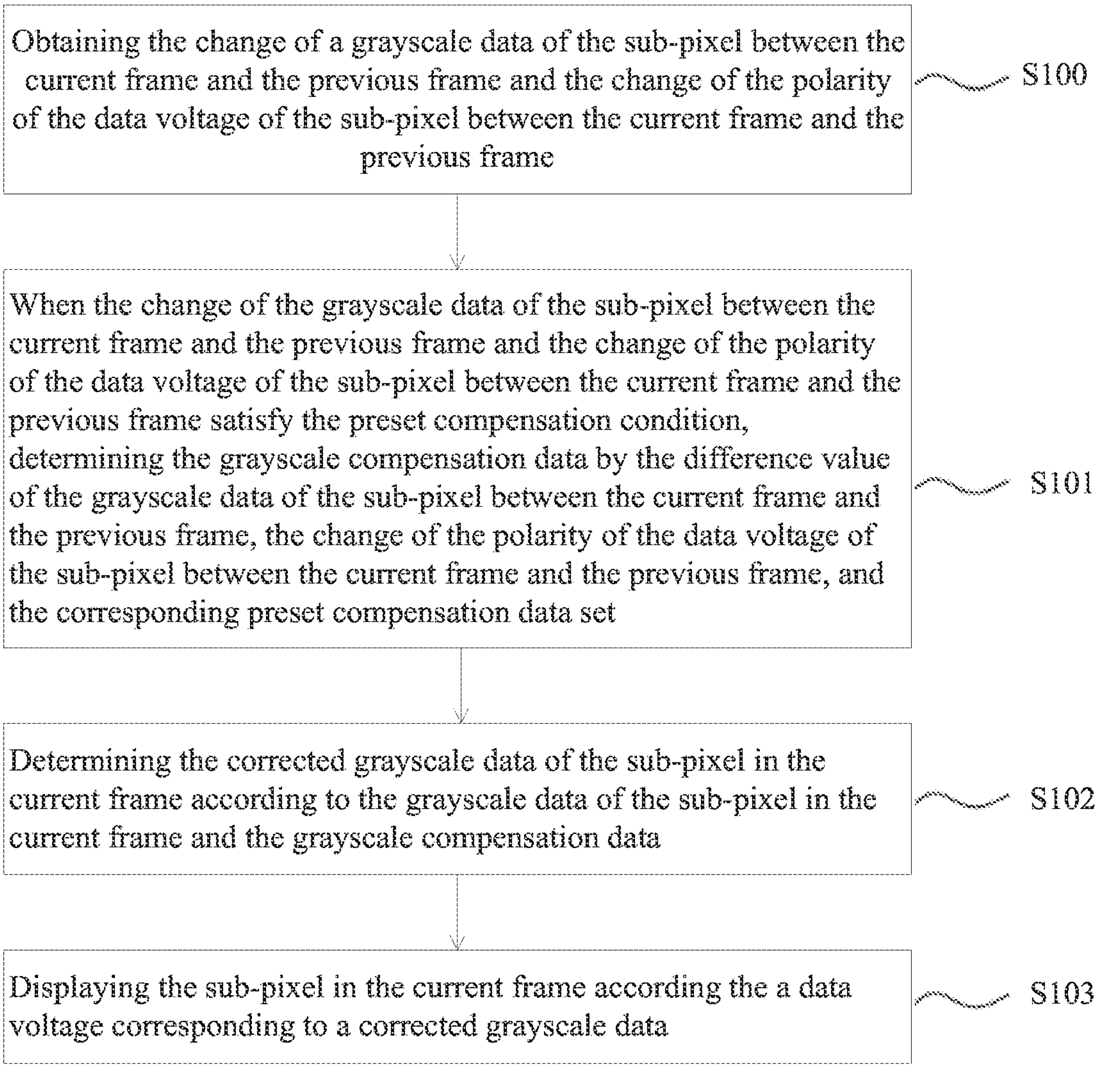
FIG. 4 is a flowchart schematic diagram of a display method of a display device according to an embodiment of the disclosure.

As shown in FIG. 4, FIG. 4 is a flowchart schematic diagram of the display method of the display device according to an embodiment of the disclosure. The display device is the liquid crystal display device. The display device includes the display panel. And the display panel includes the sub-pixels disposed in the array, data lines, and scan lines. The data voltage applied to each sub-pixel is inverted once every frame, and the display method includes following steps:

S100, obtaining the change of a grayscale data of the sub-pixel between the current frame and the previous frame and the change of the polarity of the data voltage of the sub-pixel between the current frame and the previous frame.

Wherein the grayscale data of the sub-pixel in the current frame is determined by the original grayscale data of the sub-pixel in the current frame and the preset high and low grayscale compensation set, and the grayscale data of the sub-pixel in the previous frame is determined by the original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame.

S101, when the change of the grayscale data of the sub-pixel between the current frame and the previous frame and the change of the polarity of the data voltage of the sub-pixel between the current frame and the previous frame satisfy the preset compensation condition, determining the grayscale compensation data by the difference value of the grayscale data of the sub-pixel between the current frame and the previous frame, the change of the polarity of the data voltage of the sub-pixel between the current frame and the previous frame, and the corresponding preset compensation data set.

Wherein, the preset compensation data set includes the preset difference value, and the preset grayscale compensation data corresponding to the preset difference value. The preset compensation data set is shown in Table 1 and Table 2 above, and will not be described in detail here.

S102, determining the corrected grayscale data of the sub-pixel in the current frame according to the grayscale data of the sub-pixel in the current frame and the grayscale compensation data.

S103, displaying the sub-pixel in the current frame according the data voltage corresponding to the corrected grayscale data.

The present disclosure provides the display device and the display method thereof. When the change of the grayscale data of the sub-pixel between the current frame and the previous frame and the change of the polarity of the data voltage of the sub-pixel between the current frame and the previous frame satisfy the preset compensation condition, wherein the grayscale data of the sub-pixel in the current frame is determined by the original grayscale data of the sub-pixel in the current frame and the preset high and low grayscale compensation set, and the grayscale data of the sub-pixel in the previous frame is determined by the original grayscale data of the sub-pixel in the previous frame and the preset high and low grayscale compensation set, and one of the grayscale data in the current frame and the grayscale data in the previous frame of the sub-pixel is greater than or equal to the corresponding original grayscale data, and the other of the grayscale data in the current frame and the grayscale data in the previous frame of the sub-pixel is less than or equal to the corresponding original grayscale data, a grayscale compensation data is determined by the difference value of the grayscale data of the sub-pixel between the current frame and the previous frame, the change of the polarity of the data voltage of the sub-pixel between the current frame and the previous frame, and the corresponding preset compensation data set, wherein the preset compensation data set includes the preset difference value, and the preset grayscale compensation data corresponding to the preset difference value. A corrected grayscale data of the sub-pixel in the current frame is determined according to the grayscale data of the sub-pixel in the current frame and the grayscale compensation data. The sub-pixel in the current frame is displayed according the data voltage corresponding to the corrected grayscale data to relieve the head-shaking pattern caused by a switching between a high grayscale and a low grayscale when driving by the time-domain viewing angle control algorithm, and a brightness inconsistency of the positive and negative grayscale of the same grayscale, and to improve the display quality of the display device.

In an embodiment of the present disclosure, the preset compensation condition includes: the grayscale data of the sub-pixel in the current frame is greater than or equal to the corresponding original grayscale data, and the grayscale data of the sub-pixel in the previous frame is less than or equal to the corresponding original grayscale data, and a difference value of the grayscale data of the sub-pixel in the current frame minus the grayscale data of the sub-pixel in the previous frame is greater than or equal to a first preset difference threshold, and less than or equal to a second preset difference threshold, and the second preset difference threshold is greater than the first preset difference threshold, and the first preset difference threshold is greater than or equal to zero.

In an embodiment of the present disclosure, a step of determining the corrected grayscale data of the sub-pixel in the current frame according to the grayscale data of the sub-pixel in the current frame and the grayscale compensation data includes: determining the overdrive grayscale data of the sub-pixel in the current frame by the grayscale data of the sub-pixel in the current frame and the overdrive data set; and adding the overdrive grayscale data to the grayscale compensation data to obtain the corrected grayscale data of the sub-pixel in the current frame.

In an embodiment of the present disclosure, when the change of the grayscale data of the sub-pixel between the current frame and the previous frame and the change of the polarity of the data voltage of the sub-pixel between the current frame and the previous frame do not satisfy the preset compensation condition, displaying the sub-pixel in the current frame according to the grayscale data in the current frame.

In an embodiment of the present disclosure, when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is negative, and the data voltage of the sub-pixel in the current frame is negative, the preset compensation data set is corresponding to the first preset compensation data set; and when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is positive, and the data voltage of the sub-pixel in the current frame is positive, the preset compensation data set is corresponding to the second preset compensation data set; wherein the first preset compensation data set is different from the second preset compensation data set.

The descriptions of the above embodiments are only used to help understand the technical solutions and core ideas of the disclosure. Those of ordinary skill in the art should understand that they can still modify the technical solutions recorded in the foregoing embodiments, or modify some of the technologies. The features are equivalently replaced, and these modifications or replacements do not cause the essence of the corresponding technical solutions to deviate from the scope of the technical solutions of the embodiments of the present disclosure.

What is claimed is:

1. A display method of a display device, wherein the display device comprises a display panel, and the display panel comprises a plurality of sub-pixels, and the display method comprises following steps:

obtaining a change of a grayscale data of the sub-pixel between a current frame and a previous frame and a change of a polarity of a data voltage of the sub-pixel between the current frame and the previous frame, wherein the grayscale data of the sub-pixel in the current frame is determined by an original grayscale data of the sub-pixel in the current frame and a preset high and low grayscale compensation set, and the grayscale data of the sub-pixel in the previous frame is determined by an original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame;

when the change of the grayscale data of the sub-pixel between the current frame and the previous frame and the change of the polarity of the data voltage of the sub-pixel between the current frame and the previous frame satisfy a preset compensation condition, determining a grayscale compensation data by a difference value of the grayscale data of the sub-pixel between the current frame and the previous frame, the change of the polarity of the data voltage of the sub-pixel between the current frame and the previous frame, and a corresponding preset compensation data set, wherein the preset compensation data set comprises a preset difference value, and a preset grayscale compensation data corresponding to the preset difference value;

determining a corrected grayscale data of the sub-pixel in the current frame according to the grayscale data of the sub-pixel in the current frame and the grayscale compensation data;

displaying the sub-pixel in the current frame according a data voltage corresponding to the corrected grayscale data; and when the change of the grayscale data of the sub-pixel between the current frame and the previous frame and the change of the polarity of the data voltage of the sub-pixel between the current frame and the previous frame do not satisfy the preset compensation condition, displaying the sub-pixel in the current frame according to the grayscale data in the current frame;

wherein the preset compensation condition comprises: the grayscale data of the sub-pixel in the current frame is greater than or equal to the corresponding original grayscale data, and the grayscale data of the sub-pixel in the previous frame is less than or equal to the corresponding original grayscale data, and a difference value of the grayscale data of the sub-pixel in the current frame minus the grayscale data of the sub-pixel in the previous frame is greater than or equal to a first preset difference threshold, and less than or equal to a second preset difference threshold, and the second preset difference threshold is greater than the first preset difference threshold, and the first preset difference threshold is greater than or equal to zero.

2. The display method of the display device as claimed in claim 1, wherein the step of determining the corrected grayscale data of the sub-pixel in the current frame according to the grayscale data of the sub-pixel in the current frame and the grayscale compensation data comprises:

determining an overdrive grayscale data of the sub-pixel in the current frame by the grayscale data of the sub-pixel in the current frame and an overdrive data set; and adding the overdrive grayscale data to the grayscale compensation data to obtain the corrected grayscale data of the sub-pixel in the current frame.

3. The display method of the display device as claimed in claim 1, wherein when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is negative, and the data voltage of the sub-pixel in the current frame is negative, the preset compensation data set is corresponding to a first preset compensation data set; and when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is positive, and the data voltage of the sub-pixel in the current frame is positive, the preset compensation data set is corresponding to a second preset compensation data set;

wherein the first preset compensation data set is different from the second preset compensation data set.

4. A display method of a display device, wherein the display device comprises a display panel, and the display panel comprises a plurality of sub-pixels, and the display method comprises following steps:

obtaining a change of a grayscale data of the sub-pixel between a current frame and a previous frame and a change of a polarity of a data voltage of the sub-pixel between the current frame and the previous frame, wherein the grayscale data of the sub-pixel in the current frame is determined by an original grayscale data of the sub-pixel in the current frame and a preset high and low grayscale compensation set, and the grayscale data of the sub-pixel in the previous frame is determined by an original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame;

when the change of the grayscale data of the sub-pixel between the current frame and the previous frame and the change of the polarity of the data voltage of the sub-pixel between the current frame and the previous frame satisfy a preset compensation condition, determining a grayscale compensation data by a difference value of the grayscale data of the sub-pixel between the current frame and the previous frame, the change of the polarity of the data voltage of the sub-pixel between the current frame and the previous frame, and a corresponding preset compensation data set, wherein the preset compensation data set comprises a preset difference value, and a preset grayscale compensation data corresponding to the preset difference value, and the preset compensation condition comprises:

the grayscale data of the sub-pixel in the current frame is greater than or equal to the corresponding original grayscale data, and the grayscale data of the sub-pixel in the previous frame is less than or equal to the corresponding original grayscale data, and a difference value of the grayscale data of the sub-pixel in the current frame minus the grayscale data of the sub-pixel in the previous frame is greater than or equal to a first preset difference threshold, and less than or equal to a second preset difference threshold, and the second preset difference threshold is greater than the first preset difference threshold, and the first preset difference threshold is greater than or equal to zero;

determining a corrected grayscale data of the sub-pixel in the current frame according to the grayscale data of the sub-pixel in the current frame and the grayscale compensation data; and displaying the sub-pixel in the current frame according to a data voltage corresponding to the corrected grayscale data.

5. The display method of the display device as claimed in claim 4, wherein when the change of the grayscale data of the sub-pixel between the current frame and the previous frame and the change of the polarity of the data voltage of the sub-pixel between the current frame and the previous frame do not satisfy the preset compensation condition, the sub-pixel in the current frame is displayed according to the grayscale data in the current frame.

6. The display method of the display device as claimed in claim 4, wherein the step of determining the corrected grayscale data of the sub-pixel in the current frame according to the grayscale data of the sub-pixel in the current frame and the grayscale compensation data comprises:

determining an overdrive grayscale data of the sub-pixel in the current frame by the grayscale data of the sub-pixel in the current frame and an overdrive data set; and adding the overdrive grayscale data to the grayscale compensation data to obtain the corrected grayscale data of the sub-pixel in the current frame.

7. The display method of the display device as claimed in claim 4, wherein when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is negative, and the data voltage of the sub-pixel in the current frame is negative, the preset compensation data set is corresponding to a first preset compensation data set; and when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is positive, and the data voltage of the sub-pixel in the current frame is positive, the preset compensation data set is corresponding to a second preset compensation data set;

wherein the first preset compensation data set is different from the second preset compensation data set.

8. A display device, comprising:

a timing controller, wherein the display device the timing controller comprises:

an obtaining module, configured to obtain a change of a grayscale data of a sub-pixel between a current frame and a previous frame and a change of a polarity of a data voltage of the sub-pixel between the current frame and the previous frame, wherein the grayscale data of the sub-pixel in the current frame is determined by an original grayscale data of the sub-pixel in the current frame and a preset high and low grayscale compensation set, and the grayscale data of the sub-pixel in the previous frame is determined by an original grayscale data of the sub-pixel in the previous frame and the preset high and low grayscale compensation set, and one of the grayscale data in the current frame and the grayscale data in the previous frame of the sub-pixel is greater than or equal to a corresponding original grayscale data, and the other of the grayscale data in the current frame and the grayscale data in the previous frame of the sub-pixel is less than or equal to the corresponding original grayscale data, and the polarity of the data voltage of the sub-pixel is opposite in the current frame compared to the previous frame;

a grayscale compensation data determining module, configured to determine a grayscale compensation data by a difference value of the grayscale data of the sub-pixel between the current frame and the previous frame, the change of the polarity of the data voltage of the sub-pixel between the current frame and the previous frame, and a corresponding preset compensation data set, when the change of the grayscale data of the sub-pixel between the current frame and the previous frame and the change of the polarity of the data voltage of the sub-pixel between the current frame and the previous frame satisfy a preset compensation condition, wherein the preset compensation data set comprises a preset difference, and a preset grayscale compensation data corresponding to the preset difference, and the preset compensation condition comprises:

the grayscale data of the sub-pixel in the current frame is greater than or equal to the corresponding original grayscale data, and the grayscale data of the sub-pixel in the previous frame is less than or equal to the corresponding original grayscale data, and a difference value of the grayscale data of the sub-pixel in the current frame minus the grayscale data of the sub-pixel in the previous frame is greater than or equal to a first preset difference threshold, and less than or equal to a second preset difference threshold, and the second preset difference threshold is greater than the first preset difference threshold, and the first preset difference threshold is greater than or equal to zero; and a corrected grayscale data determining module, configured to determine a corrected grayscale data of the sub-pixel in the current frame according to the grayscale data of the sub-pixel in the current frame and the grayscale compensation data; and a display panel, comprising a plurality of sub-pixels, wherein the timing controller is connected to the display panel, and the sub-pixels are configured to display in the current frame according to a data voltage corresponding to the corrected grayscale data.

9. The display device as claimed in claim 8, wherein when the change of the grayscale data of the sub-pixel between the current frame and the previous frame and the change of the polarity of the data voltage of the sub-pixel between the current frame and the previous frame do not satisfy the preset compensation condition, the sub-pixel in the current frame is displayed according to the grayscale data in the current frame.

10. The display device as claimed in claim 8, wherein the corrected grayscale data determining module comprises:

an overdrive unit, configured to determine an overdrive grayscale data of the sub-pixel in the current frame by the grayscale data of the sub-pixel in the current frame and an overdrive data set; and a corrected grayscale data calculation unit, configured to add the overdrive grayscale data to the grayscale compensation data to obtain the corrected grayscale data of the sub-pixel in the current frame.

11. The display device as claimed in claim 8, wherein when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is negative, and the data voltage of the sub-pixel in the current frame is negative, the preset compensation data set is corresponding to a first preset compensation data set; and when the grayscale data of the sub-pixel in the current frame is greater than or equal to the corresponding original grayscale data, and the grayscale data of the sub-pixel in the previous frame is less than or equal to the corresponding original grayscale data, and the data voltage of the sub-pixel in the previous frame is positive, and the data voltage of the sub-pixel in the current frame is positive, the preset compensation data set is corresponding to a second preset compensation data set;

wherein the first preset compensation data set is different from the second preset compensation data set.

* * * * *